June 3, 1930. A. S. MORRIS 1,761,531
DEVICE FOR LOCKING WINDSHIELD WIPERS
Filed Aug. 15, 1929

INVENTOR.
ALBERT S. MORRIS
BY George F. Ballay
ATTORNEY.

Patented June 3, 1930

1,761,531

UNITED STATES PATENT OFFICE

ALBERT S. MORRIS, OF OAKLAND, CALIFORNIA

DEVICE FOR LOCKING WINDSHIELD WIPERS

Application filed August 15, 1929. Serial No. 386,087.

This invention relates to a device to be used in combination with an automobile windshield wiper and is for the purpose of holding the wiper in a position where it will not interfere with the driver's vision when the wiper is not in operation.

In ordinary standard wind-shield wipers, it is a well known troublesome feature that the wiper often gets in the driver's vision when it is not in operation. There is a slight resilient pressure of the ordinary wiper against the wind-shield and when the driver stops the operation, he generally moves the wiper upward to one side where it will not interfere with his vision, but the jarring of the car when it is moving soon causes the wiper to move downward where it will show through the windshield and interfere with the driver's vision.

It is therefore an object of the present invention to provide an exceptionally simple and improved device for positively holding the wind-shield wiper out of the driver's vision when it is not in operation.

It is another object of the invention to provide the said device separately from the wind-shield wiping device so that it can be applied to wind-shield wipers already in use without the necessity of requiring the user to buy an entire new wiper.

The invention further consists in the particular combination, construction and association of the different parts such as described in the following specification, and possesses various other objects and features of advantage, some of which, with the foregoing, will be made manifest in the following description of the preferred form of the invention that is illustrated in the drawings accompanying and forming part of the specification.

It is to be understood that it is not intended to limit the invention to the embodiment shown by said drawings and description as variations may be adapted within the scope of the invention as set forth in the claims.

Figure 1:
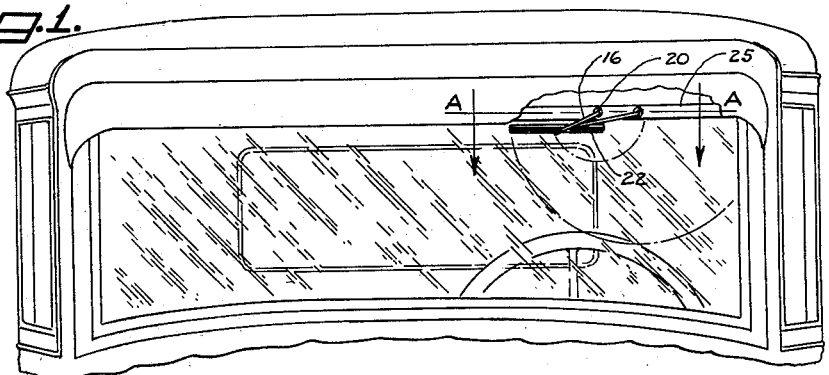
Figure 1 is a front plan view looking at an automobile wind-shield from the outside, showing the invention mounted in position on the wind-shield frame.
Figure 2:
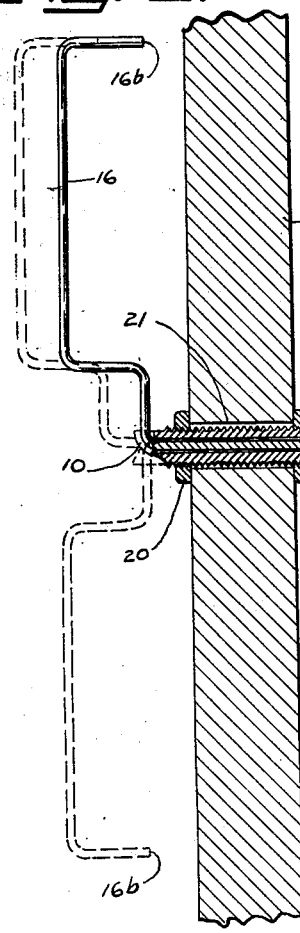
Figure 2 is a central longitudinal partial sectional view of the invention taken through line A—A of Figure 1, looking in direction of the arrows.
Figure 3:
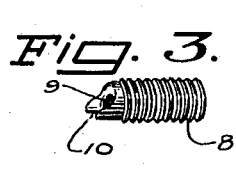
Figure 3 is an end perspective view of a threaded locking member used in the invention.
Figure 4:
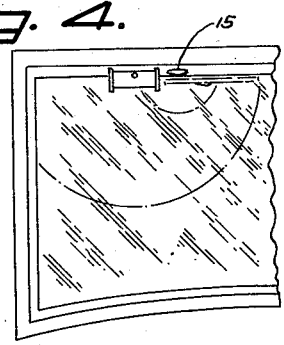
Figure 4 is a plan view of an automobile wind-shield showing the invention in position from the inside of the car.
Figure 5:
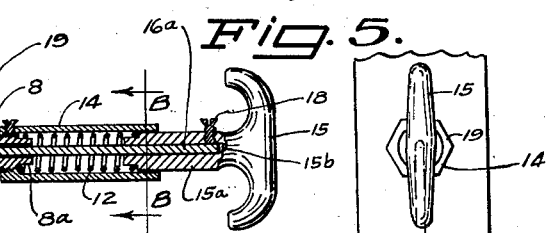
Figure 5 is an end view of the invention, looking at the device from the inside of the car.
Figure 6:
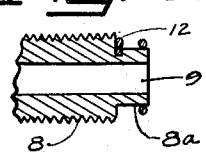
Figure 6 is an enlarged longitudinal sectional view of a portion of one end of the threaded stem on which a coiled spring used in the invention is rigidly fastened.
Figure 7:
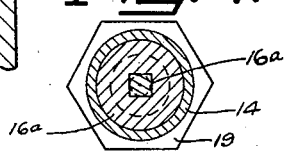
Figure 7 is an end sectional view taken on line B—B of Figure 2, looking in direction of the arrows.

Referring in detail to the different parts wherein like reference characters denote corresponding parts throughout the several views, the numeral 8 designates a threaded member having a hole 9 that longitudinally extends therethrough as shown in Figure 2 and a slot 10 in one end thereof as shown in Figure 3. The end of the threaded member opposite the slotted end is reduced to a smaller diameter than the threaded portion as designated by the numeral 8$^a$, and a coiled spring 12 is mounted on the said reduced portion and fixed thereon preferably by being spot welded so as to form a unit with the threaded member 8. A sleeve 14 is mounted over the coiled spring 12 and is fastened detachably to the threaded stem 8 as shown in Figure 2. A handle 15 having a projecting portion 15$^a$ is provided and one end of the coiled spring 12 is mounted on the projecting portion 15$^a$ and is spot welded thereon in a similar manner as the opposite end of the said spring is fixed on the threaded member 12.

The preferred means for holding the wiper is shown as comprising a hook shaped member 16 formed preferably as shown in Figure 2 and made out of material, such as wire, but may be made out of any suitable material that will serve the purpose of the invention. The inner end 16ª of the wire is preferably made square to fit into a square hole 15ᵇ provided in the projecting end of the handle 15. The said holder 16 is then substantially held in the handle by means of a set screw 18 as shown in Figure 2. Lock nuts 19 and 20 are provided and threaded on the threaded member 8 to substantially hold the device on the wind-shield frame. When it is desired to mount the device in position a hole 21 is drilled through the top of the wind-shield frame, a suitable distance from the wiper 22, and the threaded member 8 is mounted through said hole and is substantially held on the frame by the lock nuts, which are applied against the frame as shown in Figure 2. The hook 16 is removed from the handle 15 when the threaded member is mounted in the wind-shield frame and is put back in the handle when the device is ready for operation.

When it is desired to hold the wiper in locked position where it will not interfere with the driver's vision, the handle 15 is pushed forward, as shown in Figure 2, until the hook 16 is free from the slot 10 in the threaded hollow member 8 and the handle is then turned toward the wiper to a position where the end 16ᵇ thereof extends beyond the wiper. At this point the handle may be released and the compressed spring 12 will pull the hook over the wiper. As one end of the spring is fixed on the member 8, which is stationary with the wind-shield, and the other end of the spring is fixed on the handle, it will be seen that when the said handle is turned with respect to the wind-shield to a position where the hook will catch the wiper, a twisting strain will be applied on the spring which will cause the hook 16, which is fastened to the handle, to immediately snap back to its normal and locked position as soon as the handle is released, and will thus carry the wiper to the locked position with the hook. When it is desired to operate the wiper, the handle is pushed forward to a position where the end 16ᵇ of the hook will free the wiper, which will permit it to be operated the same as usual. A portion of the end of the member 8, across the slot 10, is formed curved so that the hook member 16 may be easily forced back in its normal and locked position. From the foregoing it will be seen that the invention consists primarily in the providing of a device having a hook shaped member thereon, and mounting the said device on the wind-shield in a position where it will be free from the operation of the wiper, and providing means whereby the hook shaped member can be moved to where it can catch the wiper and then turned to a locked position where the wiper will be completely free from the driver's vision.

Having thus illustrated and described a certain form of construction and arrangement of parts pertaining to the invention, it is to be understood that the improved features may be embodied on or in combination with any type of automobile wind-shield wiper, and that the parts may be built up in any suitable manner, the present illustration not being utilized as indicating the only arrangement or form of construction into which the said parts may be made; and it is desired to include in this application for Letters Patent of the United States of America, any and all patentable novelty that exists in the invention disclosed and all that comes within the fundamental principle of the invention as set forth in the claims hereinafter mentioned.

What is claimed is:

1. A device of the character described, for use in combination with a wind-shield wiper, said device comprising a hollow member that is constructed to project through the wind-shield; means for fastening the hollow member to the wind-shield; a coiled spring fastened to the end of the hollow member that extends on the inside of the wind-shield; a handle fastened to the coiled spring; a hook shaped member mounted in and through said hollow member and coiled spring and fastened to said handle; a slot provided in the end of the hollow member that extends beyond the outside of the wind-shield; said coiled spring being adapted to resiliently hold said hook shaped member in said slot; said hook shaped member being adapted to be moved forward and turned in one direction to catch the wind-shield wiper and turned in the other direction and automatically held in said slot to hold the wiper where it will be free from the driver's vision when it is not being operated.

2. A device of the character described, for use in combination with a wind-shield wiper, said device comprising a threaded tube that is constructed to project through the wind-shield; lock nuts for fastening said threaded tube to the windshield; a coiled spring fastened to the end of the tube that extends on the inside of the wind-shield; a handle fastened to the coiled spring; a hook shaped member, mounted in and through said threaded tube and coiled spring, fastened in said handle; a slot provided in the end of the tube that extends beyond the outside of the wind-shield; a curved portion formed on said end, on one side of said slot; said coiled spring being adapted to resiliently hold said hook shaped member in said slot; a tube mounted over the coiled spring and fastened to said threaded tube; said handle being slidable in said tube, to move the hook member from said slot, and the spring being tensioned to rotate said hook member against the wiper, and also retract said member into said slot.

3. In a device of the character described, a hook shaped member having a straight stem slidably and rotatably mountable through the frame of a windshield, a handle on said stem by which the stem may be pushed forward, means to retract said stem and rotate the hook member against a reciprocatable wiper, and means to lock said hook member in position.

In testimony that I claim the foregoing I have hereto set my hand this 13th day of August, 1929.

ALBERT S. MORRIS.